United States Patent
Drummond et al.

(10) Patent No.: US 7,475,653 B2
(45) Date of Patent: Jan. 13, 2009

(54) SEALED-SYSTEM CRITICAL TEMPERATURE INDICATOR

(75) Inventors: Michael E. Drummond, Malvern, PA (US); Albert J. Moses, West Chester, PA (US)

(73) Assignee: Drummond Scientific Company, Broomall, PA (US)

( * ) Notice: Subject to any disclaimer, the term of this patent is extended or adjusted under 35 U.S.C. 154(b) by 0 days.

(21) Appl. No.: 10/949,485

(22) Filed: Sep. 24, 2004

(65) Prior Publication Data

US 2006/0065183 A1    Mar. 30, 2006

(51) Int. Cl.
*G01K 5/00*    (2006.01)
(52) U.S. Cl. .................. 116/217; 116/216; 116/206; 374/160
(58) Field of Classification Search ................ 116/200, 116/206, 207, 216–219; 374/160, 161, 101–107, 374/190
See application file for complete search history.

(56) References Cited

U.S. PATENT DOCUMENTS

| | | | | |
|---|---|---|---|---|
| 2,983,247 A | * | 5/1961 | Greenspon | 116/216 |
| 3,055,759 A | * | 9/1962 | Busby et al. | 116/207 |
| 3,090,236 A | * | 5/1963 | Nicol | 116/207 |
| 3,233,459 A | * | 2/1966 | Loomis et al. | 116/206 |
| 3,701,282 A | * | 10/1972 | Peterson | 116/216 |
| 3,877,306 A | * | 4/1975 | Heinmets | 116/217 |
| 4,066,567 A | * | 1/1978 | Labes | 374/102 |
| 4,114,443 A | * | 9/1978 | Clark | 116/217 |
| 4,120,818 A | * | 10/1978 | Swindells et al. | 116/207 |
| 4,170,138 A | * | 10/1979 | Wiebe | 374/193 |
| 4,191,125 A | * | 3/1980 | Johnson | 116/219 |
| 4,353,990 A | * | 10/1982 | Manske et al. | 116/207 |
| 4,457,252 A | * | 7/1984 | Manske | 116/216 |
| 4,664,056 A | * | 5/1987 | Jehanno | 116/217 |
| 5,110,215 A | * | 5/1992 | Labes | 374/106 |
| 5,158,364 A | * | 10/1992 | Labes | 374/106 |
| 5,215,378 A | * | 6/1993 | Manske | 116/216 |
| 6,042,264 A | * | 3/2000 | Prusik et al. | 374/106 |
| 6,176,197 B1 | * | 1/2001 | Thompson | 116/217 |
| 6,289,794 B1 | * | 9/2001 | Carmon | 99/342 |

FOREIGN PATENT DOCUMENTS

| | | | |
|---|---|---|---|
| FR | 2582397 A1 | * | 11/1986 |
| GB | 2209396 A | * | 5/1989 |
| JP | 59084128 A | * | 5/1984 |

* cited by examiner

*Primary Examiner*—R. A. Smith
*Assistant Examiner*—Amy Cohen Johnson
(74) *Attorney, Agent, or Firm*—Joseph M. Konieczny, Sr.

(57) ABSTRACT

An apparatus that indicates whether an object has been exposed to a predetermined critical temperature T. The apparatus housing has a reservoir portion and a capillary tube portion in fluid connection with the reservoir portion. A first fluid is contained within the reservoir portion. A second fluid is contained within the capillary portion. A barrier is located intermediate the first fluid and second fluid. The barrier prevents the first and second fluids from intermixing until the apparatus is exposed to the critical temperature, and then allows at least a portion of the second fluid to mix with the first fluid when the apparatus is exposed to the critical temperature. An observable characteristic of one of the fluids irreversibly changes when the apparatus is exposed to the critical temperature. The housing completely encapsulates the fluids and barrier within the housing and prevents evaporation of the fluids and barrier from the housing.

39 Claims, 2 Drawing Sheets

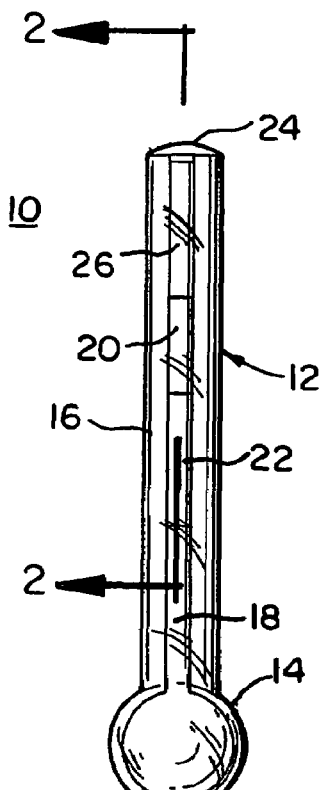
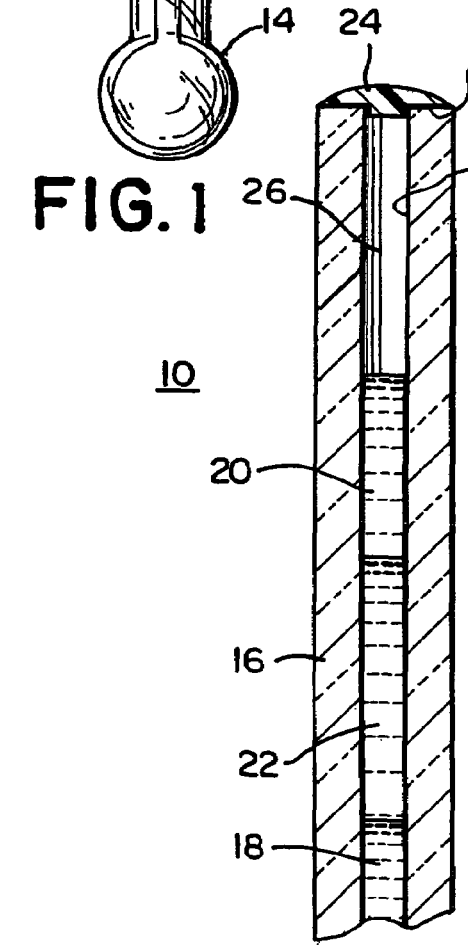
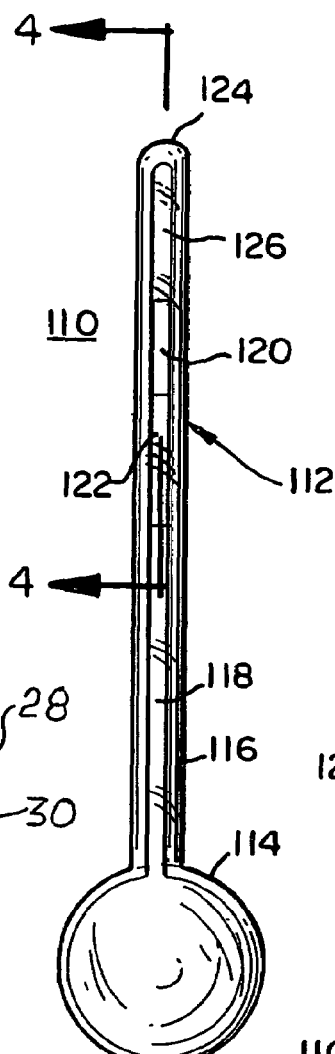
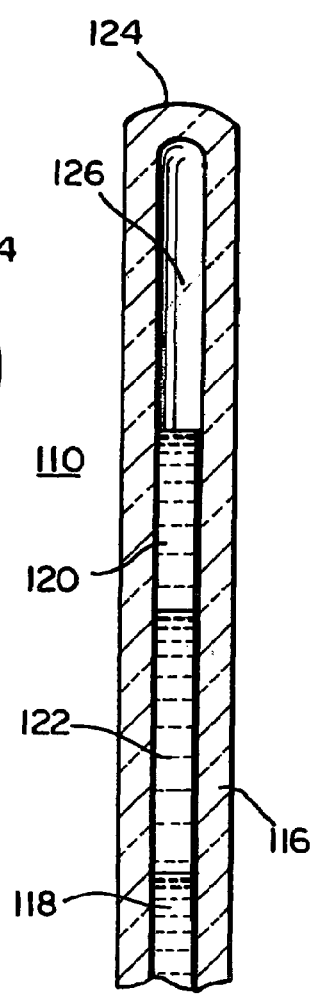

SEALED-SYSTEM CRITICAL TEMPERATURE INDICATOR

FIELD OF THE INVENTION

The present invention relates to an apparatus that visually indicates whether an object has been exposed to a predetermined critical temperature. In particular, the invention relates to a sealed-system critical temperature indicator that provides an irreversible visual indication that an object has been exposed to a predetermined critical temperature, such as the freezing point of water.

BACKGROUND OF THE INVENTION

Pharmaceuticals, reagents, diagnostic tests, and other objects often require refrigerated storage for preservation. Exposure to conditions below recommended temperatures, usually the freezing point of an aqueous solution, may change the operating characteristics of the object or render the object useless for its intended purpose. For this reason, many objects are packaged with a critical temperature indicator, which alerts the end user if the object has been exposed to conditions below the recommended critical temperature.

One known type of critical temperature indicator is disclosed by Manske, U.S. Pat. No. 4,457,252,1 incorporated herein by reference. Manske discloses a critical temperature indicator having a thermometer-like bulb and capillary tube housing. The bulb and a portion of the capillary tube are filled at ambient temperature with a first colorless reagent, which is separated within the capillary tube from a second dyed reagent by a very small amount of liquid or (barrier segment), which is not miscible with either of the reagents. In the preferred embodiment, the reagents are organic compounds. At the solidification temperature, the first reagent in the bulb undergoes a significant volume reduction, thereby drawing by capillary action the barrier segment and the second dyed reagent into the bulb. The two reagents mix and the bulb assumes the color of the dye. Because the reagents do not separate upon heating, the device gives an irreversible indication that the device has been exposed to the solidification temperature of the first reagent, which is also the critical temperature of the device.

The housing of Manske's device is formed from a continuous piece of capillary tubing. While the bulbous end of the tube is closed, the other end is open to the atmosphere. As a result, Manske's device often fails or prematurely "indicates" due to evaporation of the barrier segment through the open end of the capillary tube.

Another cause of failure of Manske's device is barrier segmentation. It is known that normal temperature fluctuations below the critical temperature cause movement or "cycling" of the reagent fluids and barrier segment back and forth within the glass capillary tube. During cycling, the barrier segment and reagents adhere to minute "nucleating" sites present on the capillary tube. Over time, the volume of fluid adhered at the nucleating sites steadily increases, which causes segmentation of the barrier segment and premature indication of the device. Both barrier segment evaporation and segmentation decrease the usable shelf life of the device.

SUMMARY OF THE INVENTION

The present invention provides a critical temperature indicator that has a completely enclosed housing. The housing is formed from an elongate capillary tube that has a first open end and a bulbous reservoir integrally formed at the second end. The capillary tube portion is in fluid connection with the reservoir portion. The volume of the reservoir portion is greater than the volume of the capillary portion.

A first reagent fluid is contained within the reservoir portion. A second reagent fluid is contained within the capillary portion. A barrier is located intermediate the first and second fluid. The barrier prevents the first and second reagents from intermixing until the apparatus is exposed to the critical temperature, and then allows at least a portion of the second reagent to mix with the first reagent when the apparatus is exposed to the critical temperature. If the indicator is exposed to the critical temperature, an observable characteristic, such as color, of the first reagent irreversibly changes.

A permanent seal is applied to open end of the capillary tube so that the housing completely encapsulates the reagents and barrier and prevents evaporation of the reagents and barrier from the housing. The seal may comprise an adhesive, heat seal, a plug or a cap.

The first reagent exhibits the property of volume reduction upon solidification and changes to the solid state at the critical temperature T. The second reagent is miscible with the first reagent and has a solidification temperature lower than the solidification temperature of the first reagent. In a preferred embodiment, both reagents are organic compounds.

Either the first or second reagent has an indicator therein that gives a visual indication that the first reagent has been contacted by the second reagent. The indicator is preferably a dye dissolved within the second reagent that irreversibly changes the color of the first reagent when the fluids mix.

At room temperature, the first reagent completely fills the reservoir portion and partially fills the capillary tube portion, while the second reagent partially fills the capillary tube portion. At the critical temperature, the first reagent solidifies and its volume shrinks to a volume less than the volume of the reservoir portion. When this occurs, capillary action draws the barrier and second reagent into the reservoir portion. Once the first reagent melts, the second reagent mixes with the first reagent and changes the color of the first reagent. Since the reagents do not separate upon heating, the dye remains in the reservoir portion and provides an irreversible, continuous indication that the indicator has been exposed to the solidification temperature of the first reagent 18 and the critical temperature T.

BRIEF DESCRIPTION OF THE DRAWINGS

FIG. 1 is a side elevational view of a critical temperature indicator in accordance with an embodiment of the invention;

FIG. 2 is a cross-sectional view taken along lines 2-2 of FIG. 1;

FIG. 3 is a side elevational view of a critical temperature indicator in accordance with a further embodiment of the invention;

FIG. 4 is a cross-sectional view taken along lines 4-4 of FIG. 3; and, FIG. 5 is an exploded partial cross sectional view of a critical temperature indicator in accordance with another embodiment of the invention.

DETAILED DESCRIPTION OF PREFERRED EMBODIMENT(S)

Figure 5:
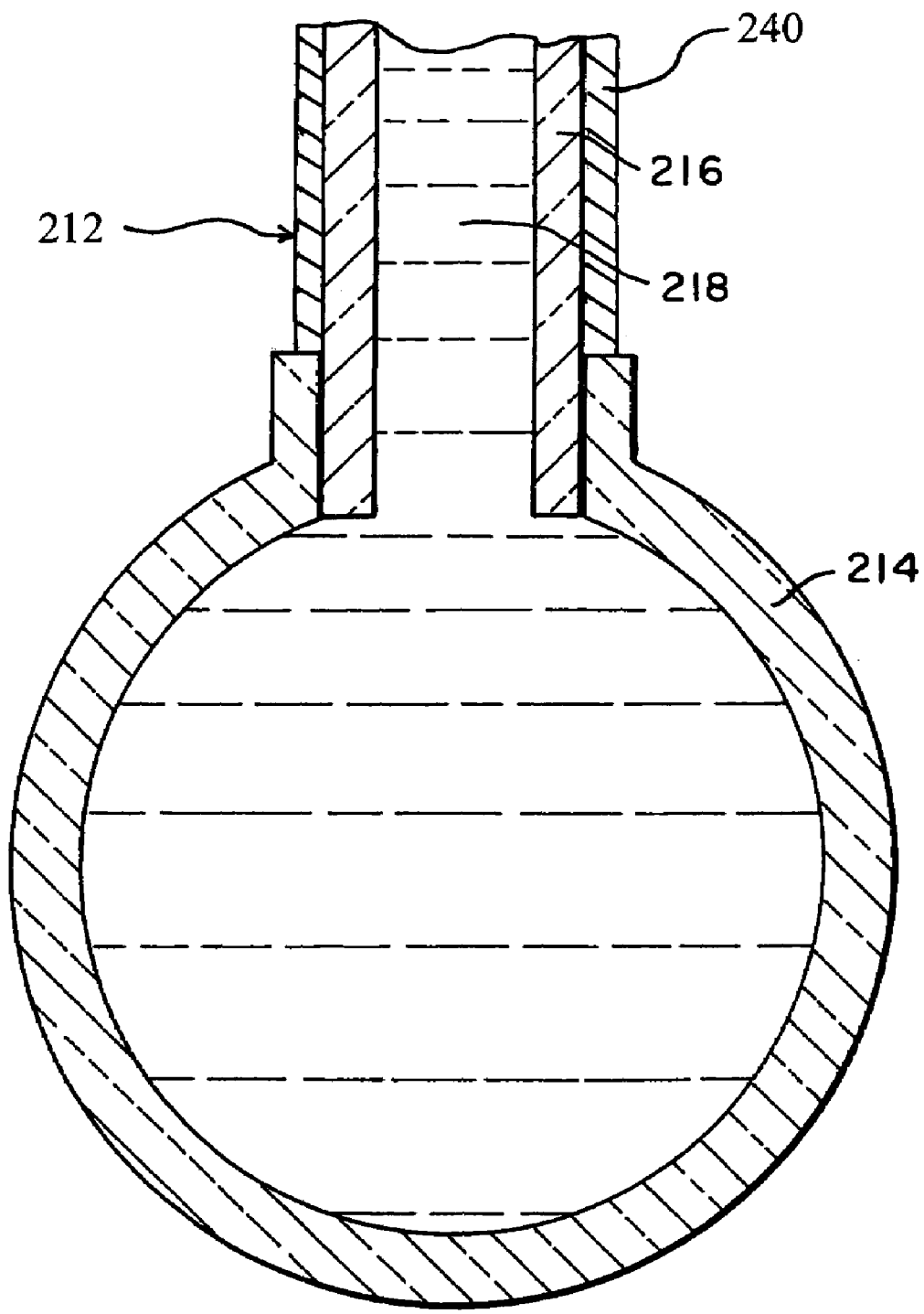

For the purpose of illustration, there is shown in the accompanying drawings several embodiments of the invention. However, it should be understood by those of ordinary skill in the art that the invention is not limited to the precise arrangements and instrumentalities shown therein and described below.

A sealed-system critical temperature indicator in accordance with an embodiment of the invention is shown in FIGS. 1 and 2 and is designated generally by reference numeral 10. The indicator 10 may be attached to or located proximate to an object, and gives a visual indication of whether the indicator 10, and hence the object, has been exposed to a predetermined critical temperature T. For example, it often desirable to know whether an aqueous-based medicament has been frozen during shipping or storage. For such use, the indicator 10 will be designed for a critical temperature T equal to 32° F. (0° C.). However, it should be appreciated by those of ordinary skill in the art that the critical temperature T of the indicator 10 can be varied by selecting a different first reagent 18, as described in greater detail below.

The indicator 10 has a transparent housing 12, which generally comprises a reservoir portion 14 and a capillary tube portion 16. In the embodiment illustrated in FIGS. 1 and 2, the housing is formed from a single piece of glass capillary tube. The reservoir portion 14 is integrally formed at one end of the tube and has a bulbous shape. The reservoir portion 14 is enclosed except for an opening that communicates with the capillary tube portion 16. The capillary tube portion 16 is generally straight and is sealed at the end opposite the reservoir portion 16. The capillary tube portion 16 is enclosed except for the opening that communicates with the reservoir portion 14.

The end of the capillary tube portion 16 is sealed by a sealant 24. As best seen in FIG. 2, the sealant adheres to both the axial end surface 28 and the interior wall surface 30 of the tubing. In a preferred embodiment, the sealant is a UV (ultraviolet) activated epoxy sold by Henkel Consumer Adhesives, Inc. under the trademark Loctite® 3492. Once the sealant is applied, the housing 12 completely encapsulates the reagents 18, 20 and barrier segment 22 and prevents them from evaporating from the housing 12.

In another embodiment shown in FIGS. 3-4, the end of the capillary tube portion 16 is heat sealed. Alternatively, the end could be sealed with an epoxy, cap or plug.

The housing 12 may be formed using known techniques for making liquid thermometer housings. In the embodiments illustrated in FIGS. 1-5, the housing 12 is about 1-2 in. (2.5-5.0 cm.) in length. However, the housing 12 could be longer or shorter depending on practical packaging considerations.

The volume ($V_r$) of the reservoir portion 14 should be greater, preferably much greater, than the volume ($V_c$) of the capillary tube portion 16. It is preferred to maximize the ratio $V_r/V_c$ to insure that the second reagent 20 in the capillary tube portion 16 is drawn by capillary action into the reservoir portion 14 when the first reagent 18 solidifies. For example, in the embodiment shown in FIGS. 1 and 2, the volume of the reservoir portion 14 is 50 µl, while the volume of the capillary tube portion 16 is only about 5 µl. In the embodiment illustrated in FIGS. 3 and 4, the volume of the reservoir portion 14 is about 175 µl, while the volume of the capillary tube portion 16 is about 10 µl.

In the embodiment illustrated in FIGS. 1-4, the glass tube ratio, i.e., OD/ID ratio, is about 4. The thickness of the glass capillary tube must be balanced to insure that the bulbous end formed therefrom is strong and uniform. If the capillary tube wall thickness is too thin, the bulbous reservoir will be uniformly fragile. On the other hand, if the capillary tube wall thickness is too thick, the thickness of the wall of the bulbous reservoir will be "loaded", i.e., one side of the bulb will be much thicker than the other side, thereby forming fragile spots.

In a preferred embodiment, the inner diameter (ID) of the glass capillary tube is about 0.020 and the OD is 0.080 in. Increasing or decreasing the ID can enhance segmenting of the barrier, particularly if the ID is increased. Further, if the ID is too small, then the amount of second dyed reagent that is drawn into the reservoir portion 14 is also small and limits the observability of the color change.

Further, if the ID is too small in relation to the reservoir portion 14, then normal temperature fluctuations will cause the second dyed reagent to be drawn into the reservoir portion 14 (downward temperature flux), or cause the reservoir portion 14 to break due to internal pressure (upward temperature flux). Conversely, if the ID is too large in relation to the reservoir portion 14, the volume reduction of the first reagent upon solidification will be insufficient to draw the second reagent into the reservoir portion 14, and no mixing of the reagents will occur.

At room temperature, the first reagent 18 completely fills the reservoir portion 14. With reference to the orientation shown in FIG. 1, the first reagent 18 also partially fills the lower section of the capillary tube portion 16. The first reagent 18 should be selected from the group of fluids that exhibit the property of significant volume reduction upon solidification. Preferably, the first reagent 18 has a volume reduction of about 8 percent or more by volume upon solidification. For example, the first reagent 18 may be selected from, or be mixtures of, the following group of fatty acids and organic compounds: octyl caprylate, heptyl caprylate, hexyl laurate, octyl caprate, butyl myristate, isopropyl myristate, decyl caprate, ethyl myristate, isopropyl palmitate, lauryl caprate, butyl stearate, decyl myristate, octadecyl acetate, lauryl palmitate, and cetyl palmitate. In the embodiment shown in FIGS. 1-4, the first fluid is a mixture of octyl capralate and hexyl laurate, which has a solidification temperature of 32° F. (0° C.)

In addition, the first reagent 18 should be selected based on the intended critical temperature T of the indicator 10. Since each of the above-listed fluids solidifies at a different temperature ranging from about −1.3° F. (−18.5° C.) to about 120° F. (49° C.), the critical temperature T of the indicator 10 can be selected within a wide range of temperatures. The first reagent 18 selected for the critical temperature indicator 10 will depend on the critical temperature of concern to the end user.

With reference to the orientation shown in FIG. 1, the second reagent 20 is contained within the middle/upper section of the capillary tube portion 16. The second reagent 20 may be any fluid that is miscible with the first reagent 18 and which has a solidification temperature that is lower than the solidification temperature of the first reagent 18. For example, the second reagent may be selected from, or be mixtures of, the following organic compounds: octyl caprylate, heptyl caprylate, hexyl laurate, octyl caprate, butyl myristate, isopropyl myristate, decyl caprate, ethyl myristate, isopropyl palmitate, lauryl caprate, butyl stearate, decyl myristate, octadecyl acetate, lauryl palmitate, cetyl palmitate, trioctyl phosphate, and bis(2-ethylhexyl)phthalate). In the embodiment shown in FIGS. 1-4, the second reagent 20 comprises octyl caprylate, which has a solidification temperature slightly lower than the first reagent 18.

In a preferred embodiment, a dye is dissolved in the second reagent 20, which discolors the first fluid 18 when the fluids mix. The dye may be any water base or organic dye that is compatible with and will dissolve in the second fluid 20. In the embodiments shown in FIGS. 1-4, the dye comprises waxolin violet VA, available from ICI United States, Inc.

A barrier 22 separates the first 18 and second 20 reagents until the indicator 10 is exposed to the critical temperature. The barrier 22 is located intermediate the first 18 and second 20 reagents. The barrier 22 should be immiscible with both the first 18 and second 20 reagents and should have a solidification temperature that is lower than the solidification temperature of the first reagent 18. For example, the barrier 22 may be selected from the following: a saturated solution of nickel II nitrate in water; perfluourocarbon compounds, which are completely fluorinated organic compounds such as those manufactured by the 3M Company under the trademark Fluorinert®; other aqueous solutions of salts such as ammonium chloride, calcium chloride, iron chloride, lithium chloride, potassium bromide, potassium chloride, potassium iodide, sodium bromide, sodium chloride or sodium nitrate; or other glycols or dihydric alcohols such as ethylene glycol. In the embodiments shown in FIGS. 1-4, the barrier 22 comprises ethylene glycol with a green water base food colorant.

It is preferred that the barrier liquid's affinity for glass be minimized so that the number of nucleating sites is reduced. For example, increasing the water content of the ethylene glycol reduces the number of nucleating sites, which reduces barrier breakdown during cycling.

In alternative embodiments of the invention, the barrier 22 may comprises a solid plug of Teflon, wood, or other material, such as shown in FIGS. 3-4, so long as the plug is sized to seal but slide within the capillary tube portion 16. However, a liquid barrier 22 is preferred since the liquid helps to clean the glass during cycling.

Referring to FIG. 2, the volume of the reagents 18, 20 and barrier 22 is selected so that a hollow space 26 is formed above the second reagent 20. The volume of the hollow space 26 should be maximized to help prevent any vacuum effect on movement of the fluids and prevent freeze point depression.

The housing is filled using known techniques, such as the technique disclosed in Manske, U.S. Pat. No. 4,457,252. For example, the reagents 18,20 and barrier fluid 22 may be introduced by alternatively heating and cooling the housing 12 to draw the desired fluid into the housing 12.

The housing 12 is preferably formed from glass tubing. However, other types of hydrophilic tubing, such a plastic, may be used depending on the particular fluid selected for inclusion in the housing 12. If the housing 12 is not made of glass, the substitute material must be resistant to attack by the reagents and barrier fluid.

Further, if the housing is not made of glass, a material should be selected that does not have capillarity that is significantly greater than the capillarity of glass. Materials that have a high level of "capillarity" also have a high number of nucleating sites, which cause barrier segmentation. Additionally, no matter what the material, the reservoir portion, and preferably the entire housing, should be transparent so that the color change of the first reagent is observable.

An alternative embodiment of the indicator is shown in FIGS. 3 and 4 and is designated generally be reference numeral 110. The indicator has a housing 112 having a reservoir portion 114 and a capillary tube portion 116. First 118 and second 120 reagents are separated by a barrier 122. A hollow space 126 is formed above the second reagent.

The indicator 110 is similar in construction to the indicator 10 described above. However, the end of the capillary tube portion 116 of the housing 112 is larger and is heat sealed instead of being sealed with a sealant 124 The end of the capillary tube is heat sealed by uniformly heating the end to a temperature above the molten temperature of glass, and then allowing the end to cool. Further, the barrier 122 comprises a plug instead of a fluid.

In another embodiment shown in FIG. 5, the housing 212 has a reservoir portion 214 and a capillary tube portion 216 formed as two separate components that are fused or otherwise connected in fluid communication with one another. In contrast with the capillary tube portion 216, the reservoir portion 214 that holds the first reagent 218 may be made from a non-capillary material.

In this embodiment, the capillary tube portion 216 is covered with a layer of insulating material 240. If a second reagent is selected, which has a solidification temperature only slightly lower than the solidification temperature of the first reagent, the insulation layer prevents flash freezing of the second reagent before the first reagent solidifies. Preferably, the insulation layer is transparent.

While the principles of the invention have been described above in connection with specific embodiments, it is to be clearly understood that this description is made only by way of example and not as a limitation on the scope of the invention.

The invention claimed is:

1. An apparatus that indicates whether an object has been exposed to a predetermined critical temperature T below the freezing point of the object, comprising:
   a) an impermeable housing having a reservoir portion and a capillary tube portion in fluid connection with said reservoir portion;
   b) a first fluid contained within said reservoir portion;
   c) a second fluid contained within said capillary portion;
   d) a barrier located intermediate said first fluid and said second fluid, said barrier comprising a liquid that is immiscible with said first and second fluids and preventing said first and second fluids from intermixing until said apparatus is exposed to the critical temperature T and then allowing at least a portion of said second fluid to mix with said first fluid when said apparatus is exposed to the critical temperature;
   wherein an observable characteristic of one of said fluids irreversibly changes when said apparatus is exposed to the critical temperature; and,
   wherein said impermeable housing completely encapsulates said fluids and barrier within said housing and prevents evaporation of said fluids and barrier from said housing.

2. The apparatus recited in claim 1, wherein said reservoir portion and said capillary portion are integrally formed from a continuous piece of hydrophilic tubing, which has an impermeable seal at a first end and the reservoir portion integrally formed at a second end.

3. The apparatus recited in claim 2, wherein said seal comprises a UV activated adhesive.

4. The apparatus recited in claim 3, wherein said adhesive adheres to both the axial end surface and the interior wall surface of the tubing.

5. The apparatus recited in claim 2, wherein said seal comprises a heat seal.

6. The apparatus recited in claim 1, wherein said first fluid exhibits the property of volume reduction upon solidification and said first fluid changes to the solid state at the critical temperature T.

7. The apparatus recited in claim 1, wherein said second fluid is miscible with said first fluid and has a solidification temperature lower than the solidification temperature of said first fluid.

8. The apparatus recited in claim 1, wherein the volume of said first fluid is greater than the volume of said reservoir prior to solidification, and is less than the volume of said reservoir upon solidification so that at least a portion of said second fluid is drawn into said reservoir upon solidification of said first fluid.

9. The apparatus recited in claim 1, wherein the volume of said reservoir portion is greater than the volume of said capillary portion.

10. The apparatus recited in claim 9, including an indicator in said first fluid that gives a visual indication that said first has been contacted by said second fluid.

11. The apparatus recited in claim 9, including an indicator in said second fluid that gives a visual indication that said second has been contacted by said first fluid.

12. The apparatus recited in claim 11, wherein said indicator comprises a dye dissolved within said second fluid that irreversibly changes the color of said first fluid when said fluids mix.

13. The apparatus recited in claim 12, wherein at least the reservoir portion of said housing is made from a transparent material.

14. The apparatus recited in claim 1, wherein said first and second fluids comprise organic compounds.

15. The apparatus recited in claim 14, wherein said first and second fluids comprise fatty acid esters.

16. The apparatus recited in claim 14, wherein said first fluid is selected from the group consisting of octyl caprylate, heptyl caprylate, hexyl laurate, octyl caprate, butyl myristate, isopropyl myristate, decyl caprate, ethyl myristate, isopropyl palmitate, lauryl caprate, butyl stearate, decyl myristate, octadecyl acetate, lauryl palmitate, and cetyl palmitate.

17. The apparatus recited in claim 14, wherein said second fluid is selected from the group consisting of octyl caprylate, heptyl caprylate, hexyl laurate, octyl caprate, butyl myristate, isopropyl myristate, decyl caprate, ethyl myristate, isopropyl palmitate, lauryl caprate, butyl stearate, decyl myristate, octadecyl acetate, lauryl palmitate, cetyl palmitate, trioctyl phosphate, and bis (2-ethylhexyl)phthalate).

18. The apparatus recited in claim 1, wherein said barrier is an aqueous salt solution.

19. The apparatus recited in claim 1, including an insulation layer enveloping only the length of the capillary tube portion of said housing.

20. The apparatus recited in claim 1, wherein said reservoir portion and said capillary portion are formed as two separate pieces, which are connected in fluid communication with one another.

21. The apparatus recited in claim 20, wherein said reservoir portion and said capillary portion are formed from two different materials.

22. The apparatus recited in claim 21, wherein said reservoir portion is formed from a non-capillary material.

23. An apparatus that indicates whether an object has been exposed to a predetermined critical temperature T below the freezing point of the object, comprising:
  a) an elongate capillary tube having a stem portion formed at a first end and a bulbous reservoir integrally formed at the second end;
  b) a first reagent contained within said reservoir portion of said capillary tube, said first reagent exhibiting the properties of reducing volume upon solidification and changing to the solid state at the critical temperature T;
  c) a second reagent contained within said capillary tube, said second reagent being miscible with said first reagent and having a solidification temperature lower than the solidification temperature of said first reagent;
  d) a barrier located intermediate said reagents, said barrier preventing said first and second reagents from intermixing until said apparatus is exposed to the critical temperature and then allowing at least a portion of said second reagent to mix with said first reagent when said apparatus is exposed to the critical temperature;
  e) a permanent, impermeable seal on the first end of said capillary tube so that said tube completely encapsulates said reagents and barrier within said tube and prevents evaporation of said reagents and barrier from said tube, and,
  f) an insulation layer enveloping only the stem portion of the capillary tube;
  wherein an observable characteristic of one of said reagents changes when said apparatus is exposed to the critical temperature; and,
  wherein said insulation layer prevents the second reagent from freezing before said first reagent freezes.

24. The apparatus recited in claim 23, wherein said seal comprises first end is sealed with an adhesive.

25. The apparatus recited in claim 24, wherein said adhesive adheres to both the axial end surface and the interior wall surface of the tubing.

26. The apparatus recited in claim 23, wherein said seal comprises a heat seal.

27. The apparatus recited in claim 23, wherein the volume of said first reagent is greater than the volume of said reservoir prior to solidification, and is less than the volume of said reservoir upon solidification so that at least a portion of said second reagent is drawn into said reservoir upon solidification of said first reagent.

28. The apparatus recited in claim 23, wherein the volume of said reservoir portion is greater than the volume of said capillary portion.

29. The apparatus recited in claim 28, including an indicator in said first reagent that gives a visual indication that said first reagent has been contacted by said second reagent.

30. The apparatus recited in claim 28, including an indicator in said second reagent that gives a visual indication that said second reagent has been contacted by said first reagent.

31. The apparatus recited in claim 30, wherein said indicator comprises a dye dissolved within said second reagent that irreversibly changes the color of said first reagent when said fluids mix.

32. The apparatus recited in claim 31, wherein at least the reservoir portion of said housing is made from a transparent material.

33. The apparatus recited in claim 23, wherein said first and second reagents comprise organic compounds.

34. The apparatus recited in claim 33, wherein said first and second reagents comprise fatty acid esters.

35. The apparatus recited in claim 33, wherein said first reagent is selected from the group consisting of octyl caprylate, heptyl capiylate, hexyl laurate, octyl caprate, butyl myristate, isopropyl myristate, decyl caprate, ethyl myristate, isopropyl paimitate, lauryl caprate, butyl stearate, decyl myristate, octadecyl acetate, lauryl paimitate, and cetyl paimitate.

36. The apparatus recited in claim 33, wherein said second reagent is selected from the group consisting of octyl caprylate, heptyl capiylate, hexyl laurate, octyl caprate, butyl myristate, isopropyl myristate, decyl caprate, ethyl myristate, isopropyl paimitate, lauryl caprate, butyl stearate, decyl myristate, octadecyl acetate, lauryl paimitate, cetyl palmitate, trioctyl phosphate, and bis(2-ethylhexyl)phthalate).

37. The apparatus recited in claim 23, wherein said barrier is an aqueous salt solution.

38. The apparatus recited in claim 24, wherein said adhesive is a UV activated adhesive.

39. An apparatus that indicates whether an object has been exposed to a predetermined critical temperature T below the freezing point of the object, comprising:
- a) an impermeable housing having a reservoir portion and a capillary tube portion in fluid connection with said reservoir portion;
- b) a first fluid contained within said reservoir portion;
- c) a second fluid contained within said capillary portion;
- d) a liquid barrier located intermediate said first fluid and said second fluid, said barrier preventing said first and second fluids from intermixing until said apparatus is exposed to the critical temperature T and then allowing at least a portion of said second fluid to mix with said first fluid when said apparatus is exposed to the critical temperature; and,
- e) means for preventing evaporation of said liquid barrier through at least one of said first and second fluids within said housing;

wherein an observable characteristic of one of said fluids irreversibly changes when said apparatus is exposed to the critical temperature; and, wherein said impermeable housing and preventing means completely encapsulate said fluids and barrier within said housing and prevent evaporation of said fluids and barrier from said housing.

* * * * *